No. 787,005. Patented April 11, 1905.

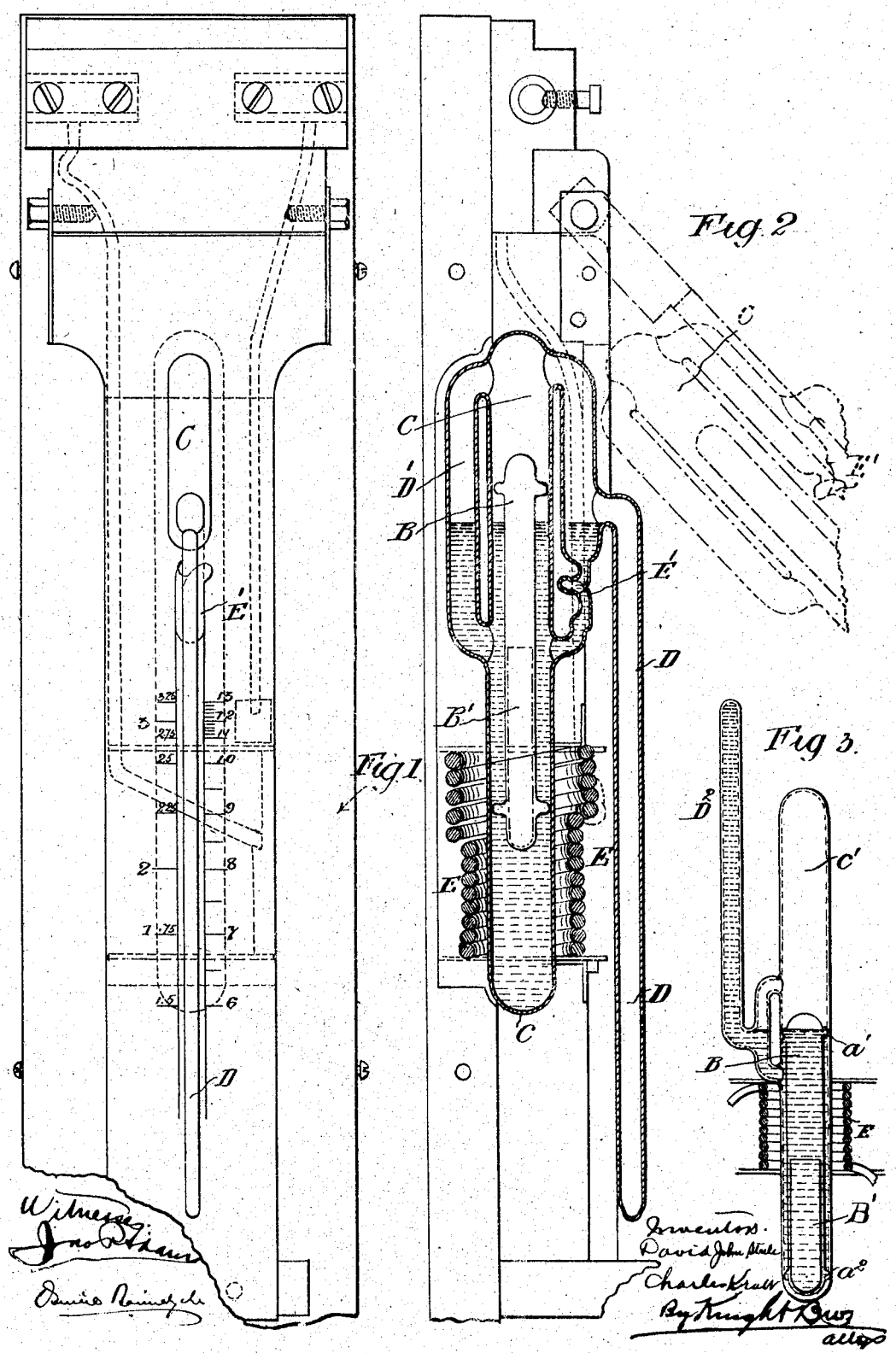

UNITED STATES PATENT OFFICE.

DAVID JOHN STEELE AND CHARLES KRATT, OF GLASGOW, SCOTLAND.

ELECTRIC RECORDING INSTRUMENT.

SPECIFICATION forming part of Letters Patent No. 787,005, dated April 11, 1905.

Application filed May 7, 1904. Serial No. 206,968.

*To all whom it may concern:*

Be it known that we, DAVID JOHN STEELE, engineer, and CHARLES KRATT, electrician, of 75 Waterloo street, Glasgow, Scotland, have invented certain new and useful Improvements in and Relating to Electric Recording Instruments, of which the following is a specification.

This invention relates to electrical recording instruments of the type designed to record the maximum electric current which has passed through a circuit during any interval of time without being affected by those variations of current which are momentary or of short duration. Most of the instruments at present used for this purpose depend for their action on the heating of a conductor which forms part of the electrical circuit in question. It is found that with these instruments when an overload takes place, due, for example, to a short circuit, the conductor, which serves as a heater, is liable to be burned out, thus breaking the circuit and interrupting the supply until the instrument is replaced. Further, the high temperature of the said conductor before it fuses causes a corresponding increase in the reading of the instrument, the value of the indication being thereby destroyed. Its calibration remains accurate, due to its action being an electromagnetic one.

The object of this invention is to provide a convenient and reliable form of instrument which will be free from these defects and which can be so arranged that the maximum current is only registered after it has passed for a predetermined interval of time.

In order that our invention may be properly understood and readily carried into effect, we have hereunto appended one sheet of drawings, of which—

Figure 1 is a front elevation of an electric recording instrument embodying our invention. Fig. 2 is a part side elevation and part vertical section of the same. Fig. 3 is a modification of the liquid-containing tube, which contains the float, all hereinafter more fully referred to.

The invention consists in a maximum-demand indicator in which a liquid supports a float which is formed either wholly or partly of magnetic material or which carries a piece of magnetic material, a solenoid being so disposed with relation to the float as to cause it to sink deeper into the liquid when the current in the solenoid is increased, and thereby to raise the level of the liquid until a portion of it overflows into a trap, the quantity which thus overflows being a measure of the maximum depth to which the float has been drawn and therefore also of the maximum current which has passed through the solenoid.

The invention further consists in providing the indicator with two liquid-containing tubes in communication in such a way that the changes of level, due to the rising and falling of the float, take place at once in the main tube, which contains the float, but have a "time lag" in the other tube, due to a constriction in one of the branches which connect them, the overflow into the trap or displacement tube taking place from this time-lag tube. The time lag for the instrument itself is arrived at by the time that the float takes to get its correct position.

The invention also consists in the particular forms of apparatus hereinafter described.

According to one method of carrying our invention into effect, reference being made to the drawings, we form the float as a sealed glass tube B of small diameter, containing in its lower portion an iron rod or wire B'. This glass tube is adapted to float in a vertical position in a liquid contained in a larger glass tube C. This glass tube C conforms to the shape of what is represented in the drawings and is carried in a light frame, which is hinged in order to permit of the liquid being displaced from the branch tube to the main tube. The glass tube consists of branch communications which connect the main tube with a parallel side or displacement tube D, of glass, the liquid thus standing at a given level in the main tube and the parallel tube or side tube D being empty, as shown in Fig. 2 of the drawings.

A solenoid E, forming part of the circuit the maximum current in which is to be recorded, surrounds the lower part of the main liquid-containing tube C and attracts the float B downward more or less strongly in proportion to the current flowing in the solenoid E. The sinking of the float B causes a corresponding rise in level of the surface of the liquid, which overflows into the side tube D through the lower branch from the main tube. In order to prevent the flow of liquid into the side tube D from being too rapid, we form a constriction or tortuous passage E' in that portion of the branch which connects the main tube with the side tube, through which constriction E' the liquid can only pass slowly. The advantage of this constriction is that any brief variations in the current, although they produce a rise or fall in the level of the liquid in the main tube, do not affect the level in the side tube. The constriction E' may be made of any convenient diameter, so that a change in the current only produces a corresponding change of level of the liquid in the side tube D if maintained for a predetermined time. A temporary short circuit, for example, on the consumer's premises would bring about no appreciable alteration in the level of the liquid so as to effect the reading of the instrument. A suitable scale is provided, by means of which this maximum current can be read off directly both in kilowatts and in amperes.

Referring again to the main glass tube C, it will be seen that we provide a second side tube D', connected to the main tube on the opposite side from the side or displacement tube D, there being no constriction in this second side tube, in which the level of liquid varies simultaneously with that in the main tube.

In the modification, as illustrated in Fig. 3, the side or displacement tube $D^2$ is so placed relatively with the larger tube that it may conveniently be fully charged with liquid when the instrument is at zero. Sufficient liquid is contained in the larger tube C' as will float the glass tube B, having the soft-iron rod or wire B'. The solenoid E is so arranged that when excited the soft-iron rod B is so attracted as to be drawn upward, and in proportion to this attraction and the strength of the current so will the liquid be displaced from the side tube $D^2$ aforesaid.

In order to prevent the float from moving laterally, projections $a'$ $a^2$ are provided on the same, which hold it centrally with regard to the outer tube; but any other suitable form of guidance may be used.

We claim—

1. In a galvanometer, the combination with a tube comprising a main arm containing a liquid, a secondary arm adapted to receive the overflow therefrom, and a restricted tubular communication between said main and secondary arms; of an electromagnetic device, and a float in said main arm adapted to be attracted by said electromagnetic device for displacing said liquid.

2. In a galvanometer, the combination with a tube comprising a main arm containing a liquid, a secondary arm adapted to receive the overflow of liquid therefrom, and a restricted tubular communication between said main and secondary arms; of an electromagnetic device surrounding a portion of said main arm, and a float in said main arm adapted to be attracted by said electromagnetic device.

3. In a galvanometer, the combination with a tube comprising a main arm containing a liquid, a secondary arm adapted to receive the overflow therefrom, a third arm communicating at both ends with said main arm, and a restricted tubular communication between said main arm and said secondary arm.

In testimony whereof we affix our signatures in presence of two witnesses.

DAVID JOHN STEELE.
CHARLES KRATT.

Witnesses:
 JOHN LIDDLE,
 AGNES MACKINTOSH.